US009674425B2

(12) United States Patent
Li et al.

(10) Patent No.: US 9,674,425 B2
(45) Date of Patent: Jun. 6, 2017

(54) IMAGE ACQUISITION METHOD AND APPARATUS

(71) Applicant: TENCENT TECHNOLOGY (SHENZHEN) COMPANY LIMITED, Shenzhen (CN)

(72) Inventors: Cheng Li, Shenzhen (CN); Hui Zheng, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 14/688,123

(22) Filed: Apr. 16, 2015

(65) Prior Publication Data
US 2015/0222814 A1 Aug. 6, 2015

Related U.S. Application Data

(63) Continuation of application No. PCT/CN2013/084868, filed on Oct. 9, 2013.

(30) Foreign Application Priority Data

Oct. 18, 2012 (CN) .......................... 2012 1 0397363

(51) Int. Cl.
H04N 5/222 (2006.01)
H04N 5/232 (2006.01)
(Continued)

(52) U.S. Cl.
CPC ....... *H04N 5/23216* (2013.01); *G06F 3/0481* (2013.01); *G06F 3/04845* (2013.01);
(Continued)

(58) Field of Classification Search
CPC ............ H04N 5/23216; H04N 5/2628; H04N 5/23293; G06F 3/04847; G06F 3/0481; G06F 3/04883; G06F 3/04845
(Continued)

(56) References Cited

U.S. PATENT DOCUMENTS 8,520,019 B1 * 8/2013 Freyhult ............... G06F 3/0481
345/581
2011/0109581 A1 5/2011 Ozawa et al.
(Continued)

FOREIGN PATENT DOCUMENTS

CN 101751207 A 6/2010
CN 102082864 A 6/2011
(Continued)

OTHER PUBLICATIONS

Search Report in International Application No. PCT/CN2013/084868 dated Jan. 9, 2014.
(Continued)

*Primary Examiner* — Yogesh Aggarwal
(74) *Attorney, Agent, or Firm* — Marshall, Gerstien & Borun LLP

(57) ABSTRACT

This application provides an image acquisition method and apparatus, where the method includes: receiving an input gesture performed on an image captured by a camera; determining a filter parameter according to a current filter type and the gesture; performing a filter operation corresponding to the filter type on the image according to the filter parameter; and displaying, in real time, the image processed through the filter operation.

14 Claims, 11 Drawing Sheets

(51) Int. Cl.
    *G06F 3/0484*     (2013.01)
    *G06F 3/0488*     (2013.01)
    *G06F 3/0481*     (2013.01)
    *H04N 5/262*     (2006.01)

(52) U.S. Cl.
    CPC ...... *G06F 3/04847* (2013.01); *G06F 3/04883* (2013.01); *H04N 5/2628* (2013.01); *H04N 5/23293* (2013.01)

(58) Field of Classification Search
    USPC ................................ 348/333.01–333.05, 239
    See application file for complete search history.

(56) References Cited

U.S. PATENT DOCUMENTS

2012/0137216 A1    5/2012    Choi
2012/0176401 A1*    7/2012    Hayward ........... H04N 5/23216
                                                    345/619

FOREIGN PATENT DOCUMENTS

CN        102480567 A    5/2012
WO    WO-2004/054244 A1    6/2004

OTHER PUBLICATIONS

Office Action from Chinese Application No. 2012103973634 dated Feb. 24, 2017.
International Preliminary Report on Patentability from Application No. PCT/CN2013/084868 dated Apr. 30, 2015.

* cited by examiner

IMAGE ACQUISITION METHOD AND APPARATUS

FIELD OF THE TECHNOLOGY

The present disclosure relates to the field of video processing, and in particular, to an image acquisition method and apparatus.

BACKGROUND OF THE DISCLOSURE

Filters are image processing techniques that can rapidly modify or beautify images taken by users. In terminal devices such as mobile terminals or computers, various different filter operations may be performed by applications installed therein. Generally, an application may provide multiple filters and provide preset parameters of each filter. After selecting a filter, a user may directly view a filter effect displayed on a terminal device, that is, a video or a picture processed by the filter.

However, because parameters of filters are preset, each filter can only provide one filter effect for each video or picture. Therefore, due to limits of types and a quantity of filters, filter effects obtained by existing filter operations are relatively simple.

SUMMARY

Embodiments of this application provide an image acquisition method and apparatus, in which filter processing can be performed on an image according to a gesture of a user, thereby obtaining diversified filter effects.

An image acquisition method is provided, the method including the following steps:

receiving an input gesture performed on an image captured by a camera;

determining a filter parameter according to a current filter type and the gesture;

performing, on the image according to the filter parameter, a filter operation corresponding to the filter type; and displaying, in real time, the image processed through the filter operation.

An image acquisition apparatus is provided, the apparatus including:

a receiving unit, configured to receive an input gesture performed on an image captured by a camera;

an acquisition unit, configured to determine a filter parameter according to a current filter type and the gesture;

a performing unit, configured to perform, on the image according to the filter parameter, a filter operation corresponding to the filter type; and an output unit, configured to display, in real time, the image processed through the filter operation.

As can be seen, according to embodiments of this application, a terminal device may receive a gesture, determine a filter parameter according to a current filter type and the gesture, and perform a filter operation corresponding to the current filter type according to the filter parameter, where the current filter type may be at least one filter type that is set in advance, and may also be at least one filter type that is determined according to selection information input by a user. Therefore, when a filter operation is performed, the filter operation can be adjusted in real time according to a gesture of a user, thereby obtaining diversified filter effects.

DESCRIPTION OF EMBODIMENTS

To make technical solutions and advantages of the present disclosure more apparent, the present disclosure is further described in detail below with reference to the accompanying drawings and embodiments. It should be understood that the specific embodiments described herein are merely used for illustrating the present disclosure rather than to limit the present disclosure.

In various embodiments of this application, a gesture for an image is received, a filter parameter is acquired according to the gesture, and a filter operation is performed according to the filter parameter, so as to obtain diversified filter effects.

Figure 1:
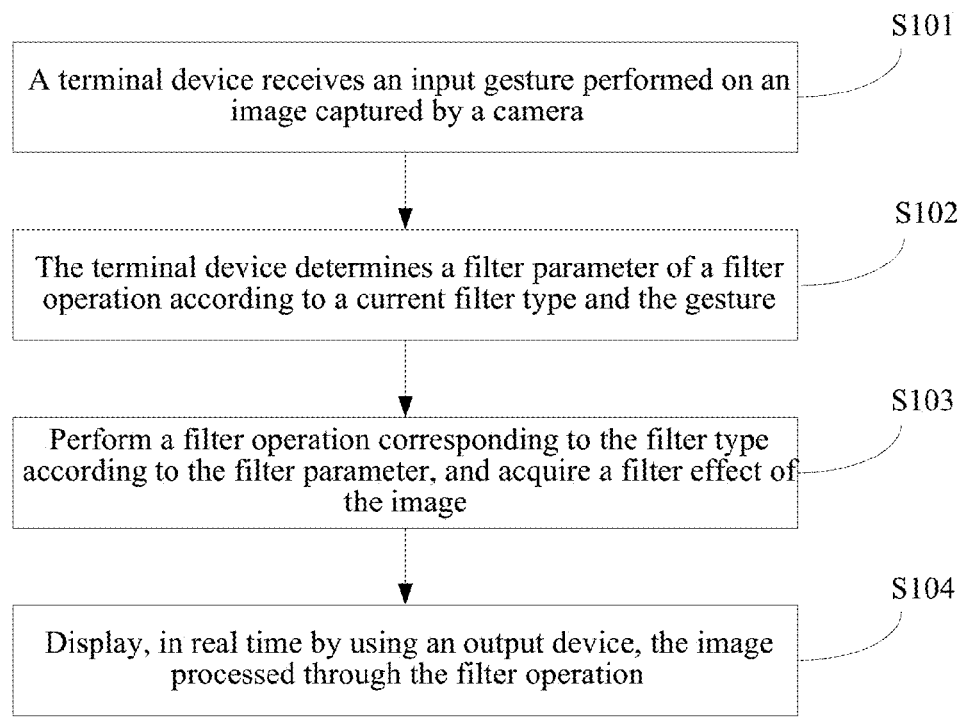
FIG. 1 is a flowchart of an image acquisition method provided in an embodiment of this application.

FIG. 1 shows an image acquisition method provided in an embodiment of this application. As shown in FIG. 1, the method includes the following steps.

In step S101, a terminal device receives an input gesture, where the gesture is performed on an image captured by a camera.

According to this embodiment of this application, the image captured by the camera is a video or a picture.

In this step, the terminal device receives the gesture using an input device.

According to an embodiment of this application, the input device may be a touch screen. A user inputs the gesture using the touch screen. Because a touch screen supports various gestures, for a mobile terminal device such as a mobile phone, a PAD, etc., a user may input a gesture flexibly and conveniently by using a touch screen. For example, the gesture input by the user by using the touch screen may correspond to a swipe instruction, a stretch instruction, a rotate instruction, a tap instruction or a double-tap instruction or the like.

According to an embodiment of this application, the input device may be at least one of a keyboard, a mouse, and a trackball. In this case, the gesture input by the user may correspond to a drag instruction, a click instruction, a double-click instruction, a right-click instruction, a rotate instruction or the like.

In step S102, the terminal device determines a filter parameter of a filter operation according to a current filter type and the gesture.

According to an embodiment of this application, the terminal device may use at least one preset filter type as the current filter type, for example, at least one of a fisheye filter, a color filter, and a swirl filter. In addition, the terminal device may also determine the current filter type according to a selection of the user. For example, the terminal device first provides the user with multiple candidate filter types, receives one or multiple filters types selected by the user, and uses the one or multiple filter types selected by the user as the current filter type.

According to an embodiment of this application, the filter parameter that can be obtained according to the gesture at least includes one or multiple of an operation instruction, filter strength, a filter color, a filter size, filter transparency. According to an embodiment of this application, the filter parameter may also include filter coordinates information.

According to an embodiment of this application, the same gesture may correspond to different operation instructions given different filter types. For example, the swipe instruction, the stretch instruction, and the rotate instruction input by using the touch screen correspond to different operation instructions for different types of filters currently used. According to an embodiment of this application, the terminal device prestores a relation which associates a filter type and a gesture with an operation instruction. According to an embodiment of this application, the terminal device may also receive and store a relation which associates a filter type and a gesture with an operation instruction, where the filter type and the correspondence are set by the user. For example, a user may associate frequently-used operation instructions with some gestures preferred by the user.

When the input device is a touch screen, the operation instruction corresponding to the gesture may be a swipe instruction, a stretch instruction, a rotate instruction, a tap instruction, a double-tap instruction or the like. When the input device is at least one of a keyboard, a mouse, and a trackball, the operation instruction corresponding to the gesture may be a drag instruction, a click instruction, a double-click instruction, a right-click instruction, a rotate instruction or the like.

According to an embodiment of this application, the filter parameter, for example, filter strength, a filter color, a filter size, filter transparency or the like, may further be determined according to the filter type and scale of the gesture, where the scale of the gesture may be acquired according to filter coordinates information.

According to an embodiment of this application, the filter parameter may be determined according to stretched length of the gesture and the size of zoom. For example, when the filter type is a black and white filter, and the gesture is a swiping, filter strength in the black and white filter, for example, a shade of black, may be determined according to the scale of the swiping. When the filter type is a Washington filter, and the gesture is a swiping, the filter color may be determined according to the scale of the swiping. When the filter type is a fisheye filter, and the gesture is a stretching, the filter size may be determined according to the scale of the stretching.

When the input device is a touch screen, a position touched by a finger is the filter coordinates information. When the input device is at least one of a mouse, a keyboard and a trackball, a position of a pointer when the gesture is made is the filter coordinates information. In addition, according to an embodiment of this application, the filter coordinates information may also be a preset position, and the filter operation is performed at the preset position by default.

In step S103, a filter operation corresponding to the current filter type is performed according to the filter parameter; and a filter effect of the image is acquired.

Figure 2A:
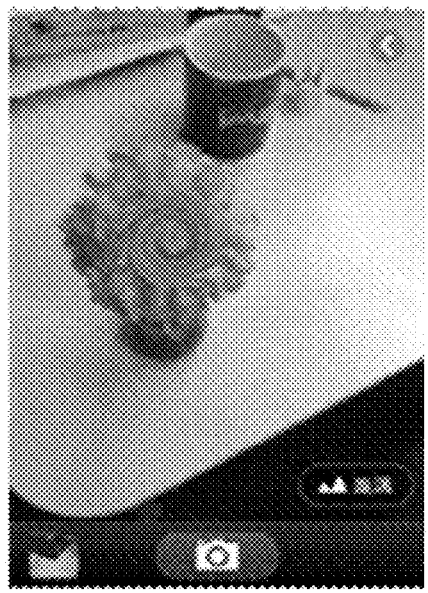
FIGS. 2a, 2b, and 2c are schematic diagrams of effects of adjusting a swirl filter by using a rotate gesture and a swipe gesture provided in an embodiment of this application.
Figure 2B:
Figure 2C:

FIGS. 2a, 2b, and 2c are schematic diagrams of effects of adjusting a swirl filter by using a rotate gesture and a swipe gesture provided in an embodiment of this application.

FIG. 2a shows an image processed using a conventional swirl filter. FIG. 2b shows a filter effect after a stretch instruction is executed when the preset filter type is a swirl filter. A gesture input by a user using a touch screen is shown in FIG. 2b. The gesture corresponds to a stretch instruction in the swirl filter. Filter strength may be determined according to scale of the gesture, that is, the magnification of a swirl The position at which the swirl filter is executed is determined according to the position of the finger performing the gesture. In FIG. 2b, the portion of the swirl corresponding to the gesture is magnified according to the stretch instruction. FIG. 2c shows an effect after a swipe instruction subsequent to the stretch instruction is executed when the preset filter type is a swirl filter. In FIG. 2c, the swirl shown in FIG. 2b is moved to a position corresponding to the swipe instruction.

Figure 3A:
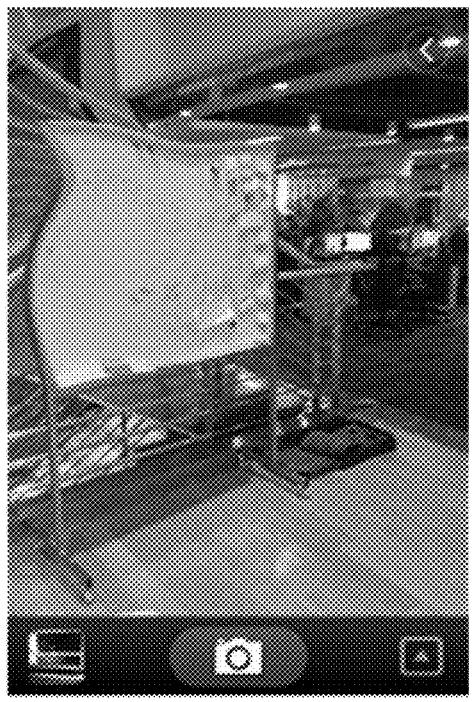
FIGS. 3a, 3b, and 3c are schematic diagrams of effects of adjusting a swirl filter by using a rotate gesture and a zoom gesture provided in an embodiment of this application.
Figure 3B:
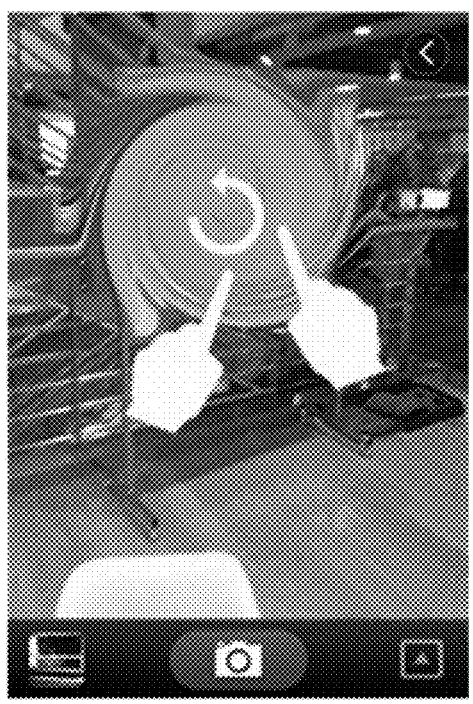
Figure 3C:

FIGS. 3a, 3b, and 3c are schematic diagrams of effects of changing a swirl filter by using a rotate gesture and a zoom gesture provided in an embodiment of this application. FIG. 3a is an image on which a swirl filter operation is performed. A user may change the strength of the swirl filter operation in FIG. 3a by making a rotate gesture as shown in FIG. 3b. The position at which the strength is to be changed is the position of the rotate gesture. The scale of the change in the strength is determined according to scale of the rotate gesture, and the effect is shown in FIG. 3b. The user may magnify a portion of the swirl in FIG. 3b by making a stretch gesture, where the magnification is determined according to the scale of the stretch gesture, and the effect based on FIG. 3b is as shown in FIG. 3c.

Therefore, according to an embodiment of this application, during a process of performing a filter operation, the parameter of the filter operation may be changed flexibly according to the input gesture. For the same image, different users may obtain different filter effects by inputting different instructions. Different users may also obtain different filter effects when the same instructions are inputted in different orders.

In step S104, the image processed through the filter operation is displayed in real time by using an output device.

According to an embodiment of this application, multiple filter operations may be performed in step S103, and a final filter effect is obtained. In this step, the final filter effect is displayed in real time.

In this step, the filter effect acquired in step S103 is displayed on a screen. For example, the image may be displayed on a touch screen that received the gesture. In an example, a smartphone, a tablet computer, and the like may all provide a touch screen for receive a gesture and displaying an image processed through a filter. In other examples, the technical mechanism may also be applied to other devices such as a desktop computer or the like. Herein, the devices listed here merely serve as examples, and the application of the technical mechanism is not only limited to the above identified devices. The image acquisition method described in this application may also be applied to any other device that has a camera and can present an image.

In this embodiment, a gesture including coordinates in an image is received, and different filter operations are performed under a preset filter type, so that filter processing manners become diversified, and various filter effects of the image can be obtained.

Figure 4:
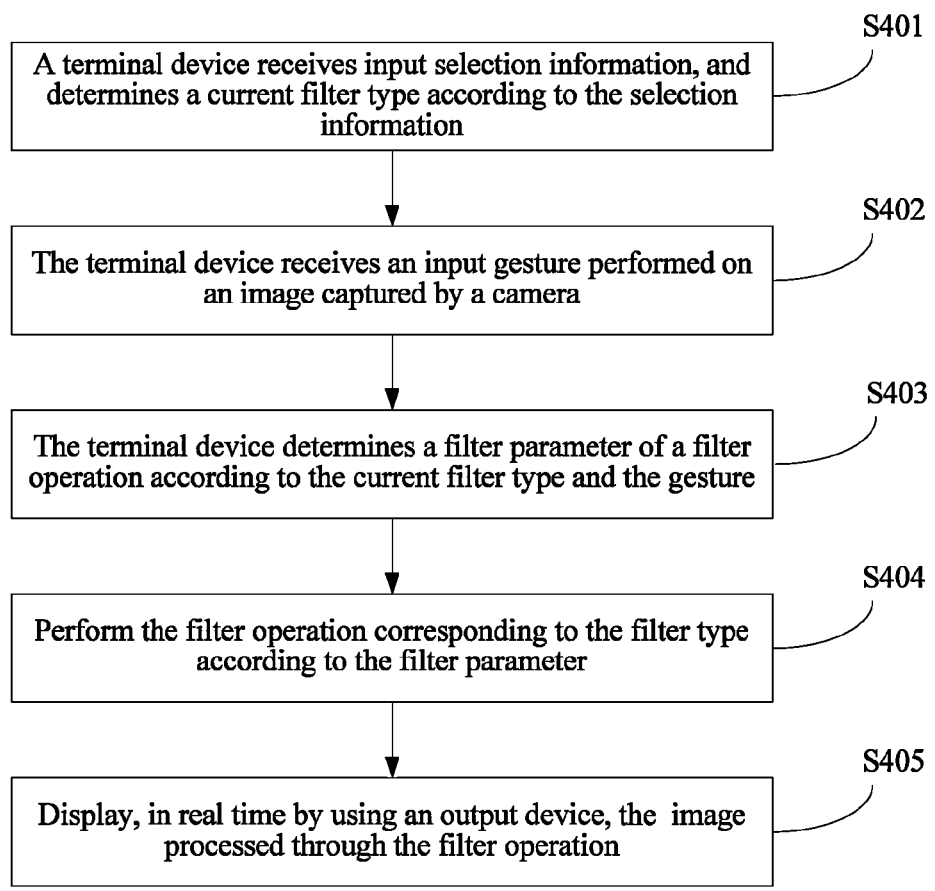
FIG. 4 is a flowchart of an image acquisition method provided in an embodiment of this application.

FIG. 4 shows an image acquisition method provided in an embodiment of this application. As shown in FIG. 4, the method includes the following steps.

In step S401, a terminal device receives input selection information, and determines a current filter type according to the selection information.

According to this embodiment of this application, one or multiple filter types may be determined as the current filter type according to the selection information, so as to obtain diversified filter effects of filter processing.

In step S402, the terminal device receives an input gesture performed on an image captured by a camera.

In step S403, the terminal device determines a filter parameter of a filter operation according to the current filter type and the gesture.

Because in this embodiment, a filter type is selected in step S401, the filter type selected in step S401 is used in step S403 directly.

In step S404, the filter operation corresponding to the filter type is performed according to the filter parameter.

In this embodiment, the filter parameter includes one or multiple of filter strength, a filter color, a filter size, and filter transparency.

The filter parameter may further include filter coordinates information, and the filter operation corresponding to the filter parameter is performed at a position corresponding to the filter coordinates information in the image.

According to an embodiment of this application, the filter parameter may be acquired according to a scale value of the gesture and/or a type of the gesture. For example, a filter parameter may be determined according to stretched length of the gesture or a size of a zoom gesture, or according to an operation instruction such as a zoom instruction, a swipe instruction, or a stretch instruction.

The filter coordinates information may be acquired according to a position of the gesture on the image so as to obtain a flexible position of the filter operation, or may also be set as several pre-defined positions, and is not limited herein.

In this step, the filter operation that corresponds to the gesture under the current filter type is determined according to a prestored relation which associates the filter type and the gesture with the filter operation. The filter operation is performed on the image according to the filter type and the filter parameter.

According to an embodiment of this application, after the filter operation is determined, the filter parameter needed by the filter operation may be determined according to a scale value of the gesture. For example, when the gesture input via a touch screen is a swiping, the filter parameter, for example, a shade of black in a black and white filter, is determined according to the distance of the swiping. Therefore, the parameter involved in the filter operation is changed by using the scale value of the gesture, so as to further improve diversity of the filter operation and obtain diversified filter effects.

The following uses an example with reference to images to describe a filter effect obtained by performing a filter operation after a gesture input via a touch screen is received in a mode of a fisheye filter.

Figure 5A:
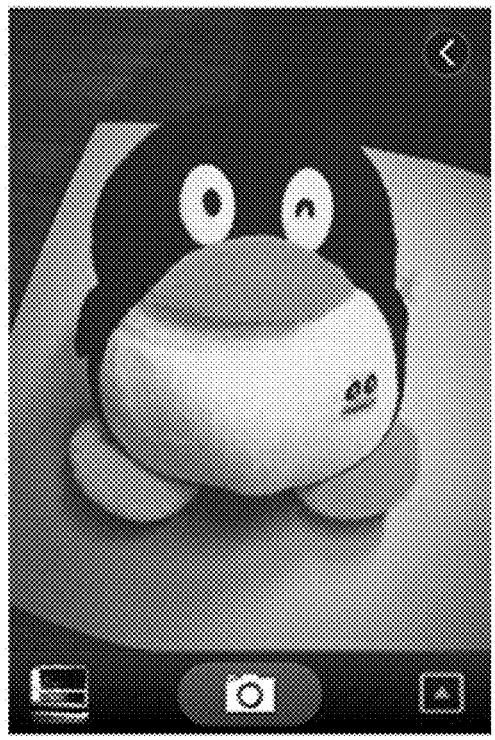
FIGS. 5a and 5b are schematic diagrams of effects of adjusting a fisheye filter by using a zoom gesture provided in an embodiment of this application.
Figure 5B:
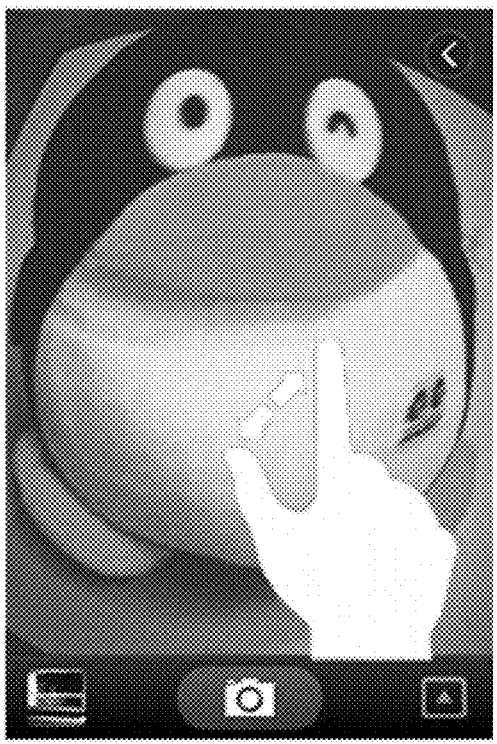

FIGS. 5a and 5b are schematic diagrams of effects of adjusting a fisheye filter by using a zoom gesture provided in this embodiment of this application. FIG. 5a shows an original image before a filter operation is performed. The size of a QQ doll in FIG. 5a is consistent with the real size. FIG. 5b is a diagram of an effect obtained after the filter operation is performed. As shown in FIG. 5b, an operation instruction corresponding to the gesture is a zoom instruction, which may adjust of the scale of distortion of the fisheye filter. According to a zooming degree indicated by the gesture, a fisheye filter operation of a level corresponding to the zooming degree is performed. For example, the gesture indicates a slight zoom, and a slight distortion operation is performed at a position in an image corresponding to filter coordinates information.

Figure 6A:
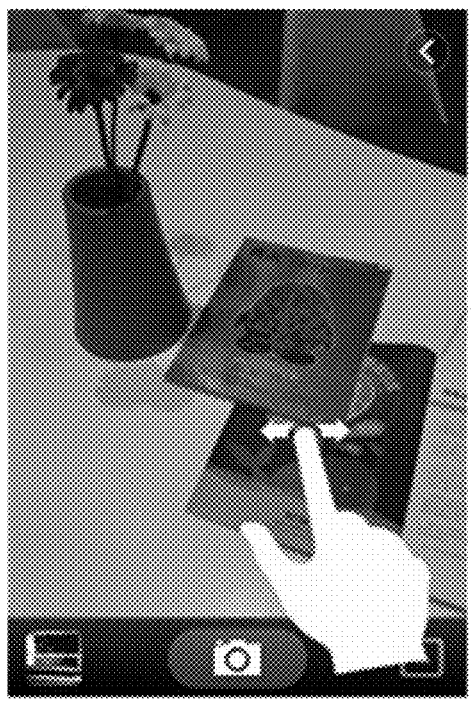
FIGS. 6a, 6b, and 6c are schematic diagrams of effects of controlling a color value of a color filter by using a swipe gesture provided in an embodiment of this application.
Figure 6B:
Figure 6C:
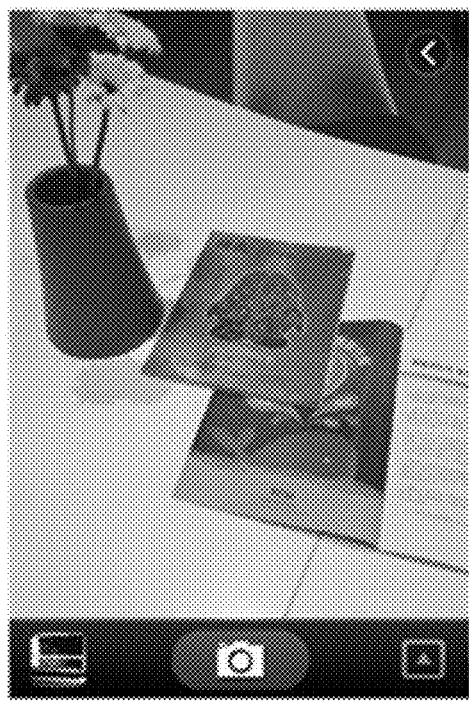

FIGS. 6a, 6b, and 6c are schematic diagrams of effects of controlling a filtered color value of a color filter by using a swipe gesture provided in an embodiment of this application. During a color filter operation, a color range corresponding to the scale of the swipe gesture is first determined, and colors out of the color range are filtered and gray degree processing is performed. By using the swipe gesture, a red vase, a green book cover, and a blue magazine page are respectively displayed in FIG. 6a, FIG. 6b, and FIG. 6, and the gray degree processing is performed on objects that are not displayed and other portions of the image.

Figure 7A:
FIGS. 7a and 7b are schematic diagrams of effects of changing a color by using a swipe gesture provided in an embodiment of this application.
Figure 7B:

FIGS. 7a and 7b are schematic diagrams of effects of changing the color by using a swipe gesture provided in an embodiment of this application. FIG. 7a is an original image on which no filter operation is performed. After the swipe gesture input via a touch screen is received, proportions of colors in FIG. 7a are changed, so as to adjust the display of colors of an image and achieve a filter effect of a Washington filter.

In step S405, the image processed through the filter operation is displayed in real time by using an output device.

According to this embodiment of this application, multiple filter operations may be performed in step S404, and a final filter effect is obtained. In this step, the final filter effect is displayed in real time.

In this step, the filter effect acquired in step S403 is displayed on a screen. For example, the image may be displayed on a touch screen that received the gesture. In an example, a smartphone, a tablet computer, and the like may all provide a touch screen function for receiving a gesture and displaying an image processed by a filter. Certainly, this mechanism may also be applied to other devices such as a desktop computer and the like. Herein, the devices listed are merely examples, and this mechanism is not only limited to the foregoing specified devices, and the image acquisition method described in this application may also be applied to any other device that has a camera and can present an image.

According to an embodiment of this application, the output device displays the image processed through the filter operation in real time by using an OpenGL ES technology and a graphic processing unit (GPU).

Figure 8:
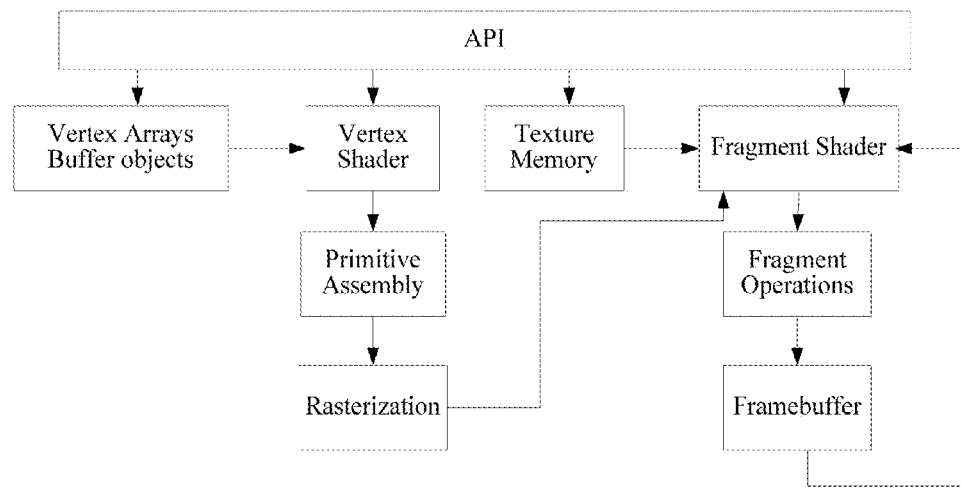
FIG. 8 is a schematic diagram of a structure of an OpenGL ES 2.0-based graphic system capable of acquiring an image according to an embodiment of this application.

As shown in FIG. 8, most graphic systems may be compared to an assembly line or a pipeline in a factory. Output of a preceding procedure serves as the input of a succeeding procedure. A main central processing unit (CPU) issues a drawing instruction, and then a hardware component may implement coordinates transformation, cropping, color or material addition. Finally, an image is displayed on a screen.

Figure 9:
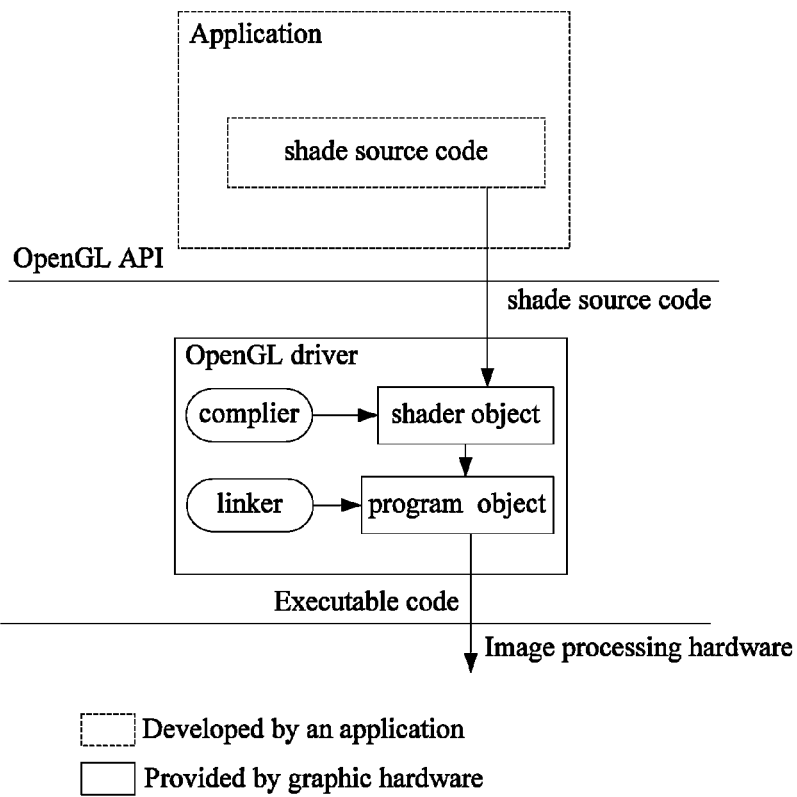
FIG. 9 is a schematic diagram of real-time rendering implemented by using a combination of software and hardware provided in an embodiment of this application.

According to an embodiment of this application, processing procedures of a filter that are most resource-consuming and time-consuming are completed by the OpenGL. A shader program is created and written in a shader, and as shown in FIG. 9, the OpenGL compiles the shader program and links it to a program. An original program acquires image data, uses the shader provided in an OpenGL pipeline procedure to perform transformation processing on each pixel of the image. The entire process is parallel. The transformation processing is programmed using a shader language, and the computation is done by a GPU of the terminal, which greatly improves the efficiency of filter processings.

Figure 10:
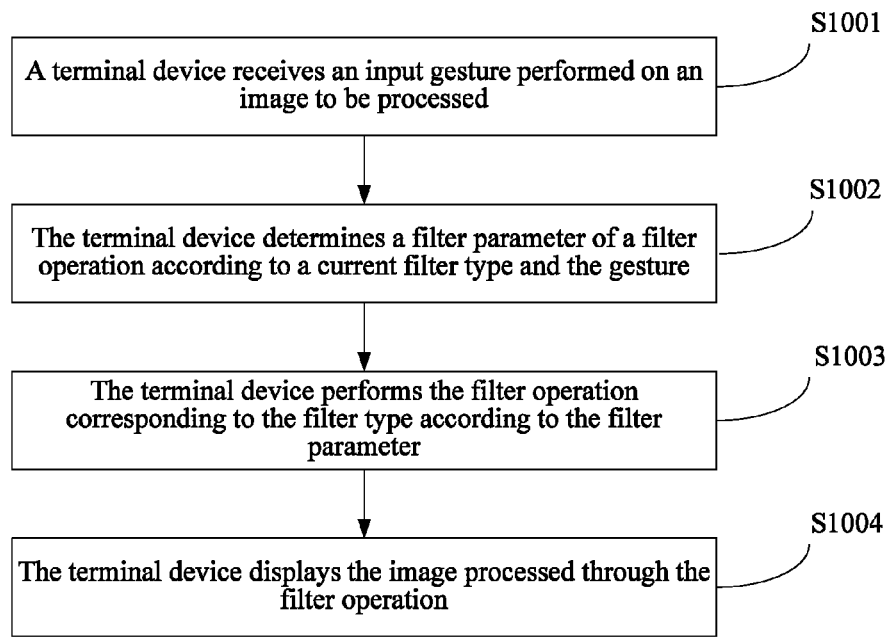
FIG. 10 is a flowchart of an image processing method provided in an embodiment of this application.

FIG. 10 is a flowchart of an image processing method provided in an embodiment of this application. As shown in FIG. 10, the method includes the following steps.

In step S1001, a terminal device receives an input gesture performed on an image to be processed.

In step S1002, the terminal device determines a filter parameter of a filter operation according to a current filter type and the gesture.

In step S1003, the terminal device performs the filter operation corresponding to the filter type according to the filter parameter.

The filter parameter may further include filter coordinates information, and the filter operation corresponding to the filter parameter is performed at a position in the image corresponding to the filter coordinates information.

The filter parameter includes at least one of a filter type, filter strength, a filter color, a filter size, and filter transparency.

According to an embodiment of this application, the filter parameter may be acquired according to a scale value of the gesture and/or a type of the gesture. The filter coordinates information may be acquired according to a position of the gesture on the image. An operation instruction corresponding to the gesture includes at least one of a swipe instruction, a stretch instruction, a rotate instruction, a tap instruction, and a double-tap instruction.

In step S1004, the terminal device displays an image processed through the filter operation.

According to an embodiment of this application, before a terminal device receives an input gesture, the method may also include: receiving input selection information, and determining the current filter type according to the selection information. According to an example, one or multiple filter types may be determined as the current filter type according to the selection information, so as to obtain diversified filter effects of filter processings.

The steps in this embodiment of this application are almost the same as the processing procedures in the foregoing embodiments, only differ in that the object processed in this embodiment is an image. In this embodiment, the terminal device is capable of displaying or storing the image after filter processing.

Figure 11:
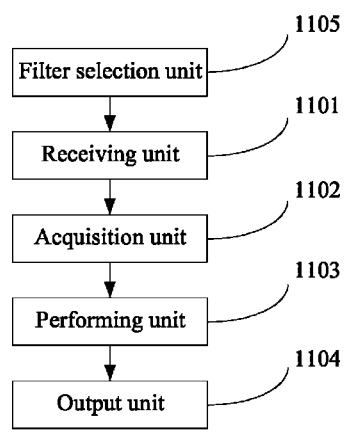
FIG. 11 is a block diagram of a structure of an image acquisition apparatus provided in an embodiment of this application.

FIG. 11 shows a schematic diagram of a structure of an image acquisition apparatus provided in an embodiment of this application. As shown in FIG. 11, the image acquisition apparatus includes a receiving unit 1101, an acquisition unit 1102, a performing unit 1103, and an output unit 1104.

The receiving unit 1101 is configured to receive an input gesture performed on an image captured by a camera.

The acquisition unit 1102 is configured to determine a filter parameter of a filter operation according to a current filter type and the gesture.

The performing unit 1103 is configured to perform the filter operation corresponding to the filter type according to the filter parameter.

The output unit 1104 is configured to display, in real time by using an output device, the image processed through the filter operation.

According to an embodiment of this application, after the receiving unit 1101 receives the gesture, the acquisition unit 1102 acquires the filter parameter. The filter parameter at least includes one or multiple of an operation instruction, a filter type, filter strength, a filter color, a filter size, and filter transparency. The operation instruction may be acquired according to the type of the gesture. The filter parameter such as the filter strength, the filter color, the filter size, and the filter transparency may be acquired according to a scale value of the gesture. The operation instruction corresponding to the gesture includes one or multiple of a swipe instruction, a stretch instruction, a rotate instruction, a tap instruction, and a double-tap instruction.

According to an embodiment of this application, the filter parameter may also include filter coordinates information. The filter coordinates information is acquired according to a position of the gesture on the image. The filter operation corresponding to the filter parameter is performed at a position corresponding to the filter coordinates information.

According to an embodiment of this application, the image acquisition apparatus may also include a filter selection unit 1105. The filter selection unit 1105 is configured to receive input selection information, and determine the current filter type according to the selection information, so that a user may select a filter type flexibly, thereby achieving more filter effects.

The foregoing apparatus corresponds to the method embodiments, and is not described herein again.

Figure 12:
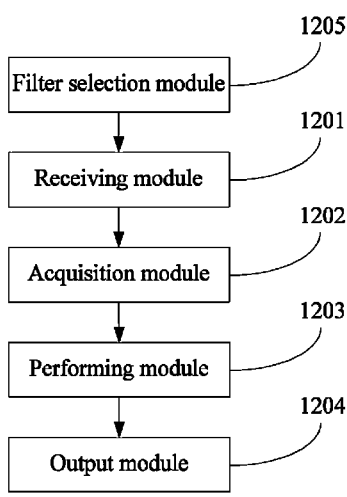
FIG. 12 is a block diagram of a structure of an image acquisition apparatus provided in an embodiment of this application.

FIG. 12 shows a schematic diagram of a structure of an image processing apparatus provided in an embodiment of this application. As shown in FIG. 12, the image processing apparatus includes a receiving module 1201, an acquisition module 1202, a performing module 1203, and an output module 1204.

The receiving module 1201 is configured to receive an input gesture performed on an image to be processed that is captured by a camera.

The acquisition module 1202 is configured to determine a filter parameter of a filter operation according to a current filter type and the gesture.

The performing module 1203 is configured to perform the filter operation corresponding to the filter type on the image to be processed according to the filter parameter.

The output module 1204 is configured to display the image processed through the filter operation.

The filter parameter includes at least one of: an operation instruction, filter strength, a filter color, a filter size, and filter transparency. The operation instruction may be acquired according to a type of the gesture. The filter parameter such as the filter strength, the filter color, the filter size, and the filter transparency may be acquired according to a scale value of the gesture. An operation instruction corresponding to the gesture includes at least one of a swipe instruction, a stretch instruction, a rotate instruction, a tap instruction, and a double-tap instruction.

According to an embodiment of this application, the filter parameter further includes filter coordinates information. The filter coordinates information is acquired according to a position of the gesture on the image. The filter operation corresponding to the filter parameter may be performed at a position corresponding to the filter coordinates information.

According to an embodiment of this application, this embodiment of this application may also include a filter selection module 1205. The filter selection module 1205 is configured to receive input selection information, and determine the current filter type according to the selection information, so that a user may select a filter type flexibly, thereby achieving more filter effects.

This embodiment is a system implementation manner corresponding to the method embodiments, and is not described herein again.

In summary, in the embodiments of the present invention, a terminal device may receive a gesture, determine a filter parameter according to a current filter type and the gesture, and perform a filter operation corresponding to the current filter type according to the filter parameter. The current filter type may be at least one filter type that is set in advance, or may be at least one filter type determined according to selection information input by a user. Therefore, when a filter operation is performed, the filter operation can be adjusted in real time according to a gesture of a user, thereby obtaining diversified filter effects.

Methods and devices provided in the embodiments of the present invention may be implemented by hardware, or a computer-readable instruction, or a combination of hardware and a computer-readable instruction. The computer-readable instruction used in the embodiments is stored, by using multiple processors, in a readable storage medium, such as a hard disk, a compact disc read-only memory (CD-ROM), a digital versatile disc (DVD), an optical disc, a floppy disk, a magnetic tape, a random access memory (RAM), a read-only memory (ROM) or another suitable storage device. Alternatively, at least a part of computer-readable instructions may be replaced by specific hardware such as a custom-made integrated circuit, a gate array, a field programmable gate array (FPGA), a programmable logic device (PLD), and a computer with a specific function.

The embodiments of the present invention provide a computer-readable storage medium for storing an instruction, so that a computer executes the method described in this specification. Specifically, systems or devices provided in the embodiments have a storage medium, in which computer-readable program code is stored, for implementing a function of any embodiment described above, and these systems and devices (or CPUs or microprocessor units (MPUs)) can read and perform the program code stored in the storage medium.

In this case, the program code read from the storage medium may implement any embodiment described above, and therefore, the program code and the storage medium storing the program code are a part of the technical solutions.

The storage medium used for providing the program code includes a floppy disk, a hard disk, a magneto-optical disk, an optical disc (such as a CD-ROM, a compact disc recordable (CD-R), a compact disc rewritable (CD-RW), a DVD-ROM, a DVD-RAM, a DVD-RW, a DVD+RW), a magnetic disk, a flash card, and a ROM. Optionally, the program code may also be downloaded from a server computer by using a communications network.

It should be noted that, for the program code executed by the computer, at least a part of operations implemented by the program code may be implemented by an operating system running on the computer, so as to implement the technical solutions of any embodiment described above, where the computer executes an instruction based on the program code.

In addition, the program code in the storage medium is written into a memory, where the memory located in an expansion card inserted into the computer or is located in an expansion unit connected to the computer. In the embodiments, a CPU in the expansion card or the expansion unit performs, based on the program code, at least a part of operations according to an instruction, so as to implement the technical solutions of any embodiment described above.

The foregoing descriptions are merely exemplary embodiments of the present invention, but are not intended to limit the present disclosure. Any modification, equivalent replacement, and improvement made without departing from the spirit and principle of the present disclosure shall fall within the protection scope of the present disclosure.

What is claimed is:

1. An image acquisition method, the method comprising:
receiving an input gesture performed on an image captured by a camera;
determining a filter operation from a plurality of filter operations corresponding to a current filter type, where the determination is according to a pre-stored relation which associates the filter operation with the filter type and the type of the gesture;
determining a filter parameter of the filter operation according to the current filter type and a scale value of the gesture;
performing the filter operation on the image according to the filter parameter; and
displaying the image processed through the filter operation in real time.

2. The method according to claim 1, wherein the filter parameter comprises at least one of filter strength, a filter color, a filter size, and filter transparency.

3. The method according to claim 1, before the receiving an input gesture, further comprising:
receiving input selection information; and
determining the current filter type according to the selection information.

4. The method according to claim 1, wherein the filter parameter comprises filter coordinates information.

5. The method according to claim 4, wherein the filter coordinates information is acquired according to a position of the gesture on the image.

6. The method according to claim 1, wherein the filter parameter comprises an operation instruction, wherein the operation instruction comprises at least one of a swipe instruction, a stretch instruction, a rotate instruction, a tap instruction, and a double-tap instruction.

7. The method according to claim 1, wherein the image captured by the camera comprises a video or a picture.

8. An image acquisition apparatus, the apparatus comprising a processor and a memory, the memory stores computer-readable instructions executable by the processor to:
receive an input gesture performed on an image captured by a camera;
determine a filter operation from a plurality of filter operations corresponding to a current filter type, where the determination is according to a pre-stored relation which associates the filter operation with the filter type and the type of the gesture;
determine a filter parameter of the filter operation according to the current filter type and a scale value of the gesture;

perform a filter operation corresponding to the filter type on the image according to the filter parameter; and display the image processed through the filter operation in real time.

9. The apparatus according to claim 8, wherein the filter parameter comprises at least one of filter strength, a filter color, a filter size, and filter transparency.

10. The apparatus according to claim 8, wherein the computer-readable instructions are executable by the processor to:

receive input selection information, and determine the current filter type according to the selection information.

11. The apparatus according to claim 8, wherein the filter parameter comprises filter coordinates information.

12. The apparatus according to claim 11, wherein the filter coordinates information is acquired according to a position of the gesture on the image.

13. The apparatus according to claim 8, wherein the filter parameter comprises an operation instruction, wherein the operation instruction comprises at least one of a swipe instruction, a stretch instruction, a rotate instruction, a tap instruction, and a double-tap instruction.

14. The apparatus according to claim 8, wherein the image captured by the camera comprises a video or a picture.

* * * * *